May 15, 1945.  G. C. GOODE ET AL  2,375,785
TWO SPEED GENERATOR DRIVE
Filed Aug. 31, 1942  3 Sheets-Sheet 1
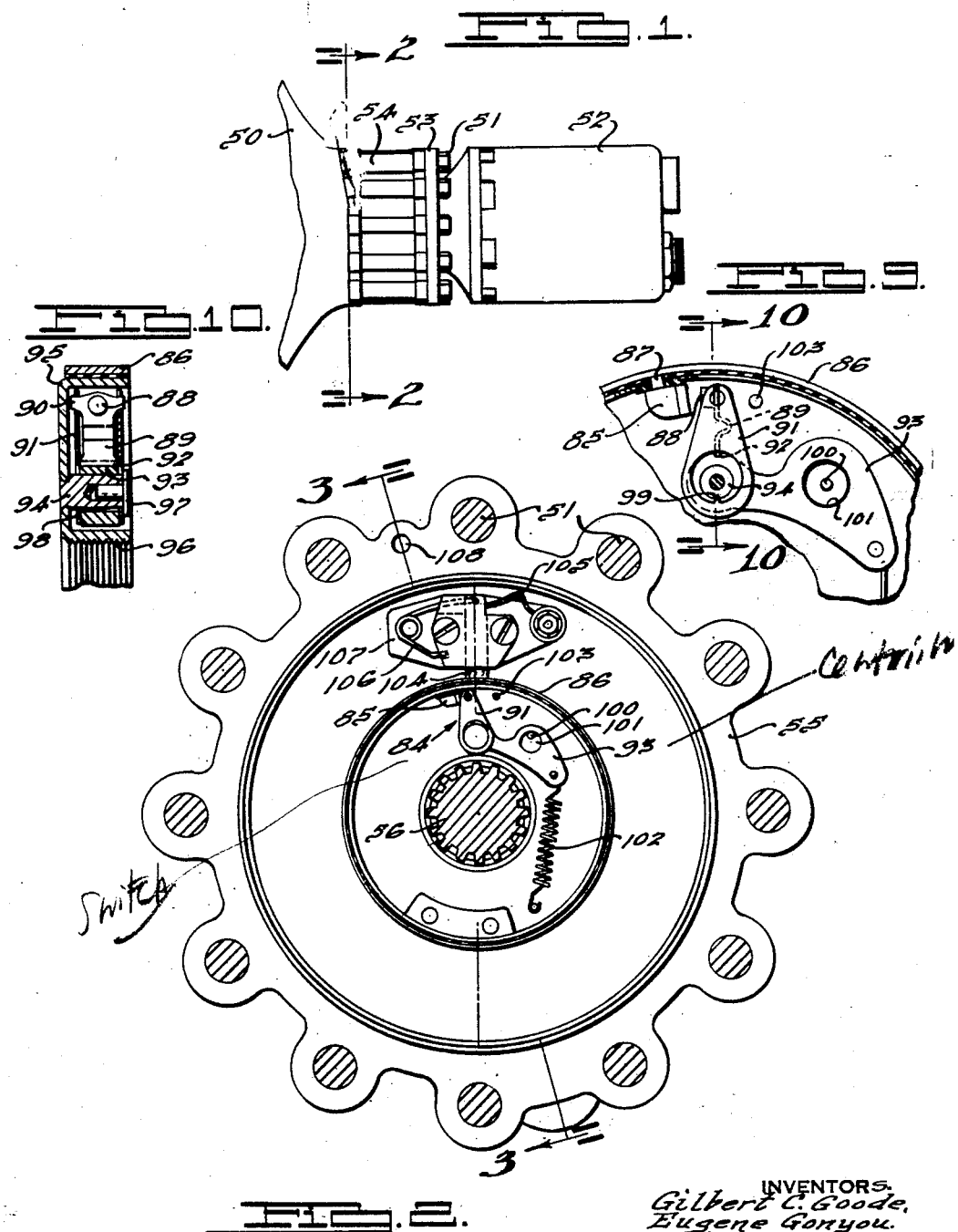
INVENTORS.
Gilbert C. Goode,
Eugene Gonyou.
BY
Harness, Dind, Pater & Harris
ATTORNEYS.

May 15, 1945.   G. C. GOODE ET AL   2,375,785
TWO SPEED GENERATOR DRIVE
Filed Aug. 31, 1942   3 Sheets-Sheet 2

INVENTORS.
Gilbert C. Goode,
Eugene Gonyou.
BY
ATTORNEYS.

May 15, 1945.  G. C. GOODE ET AL  2,375,785
TWO SPEED GENERATOR DRIVE
Filed Aug. 31, 1942  3 Sheets-Sheet 3
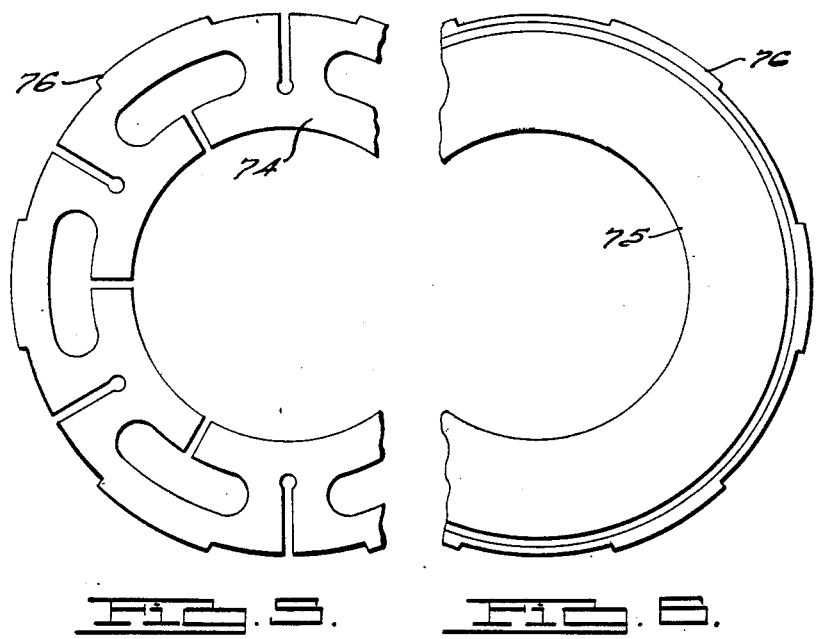
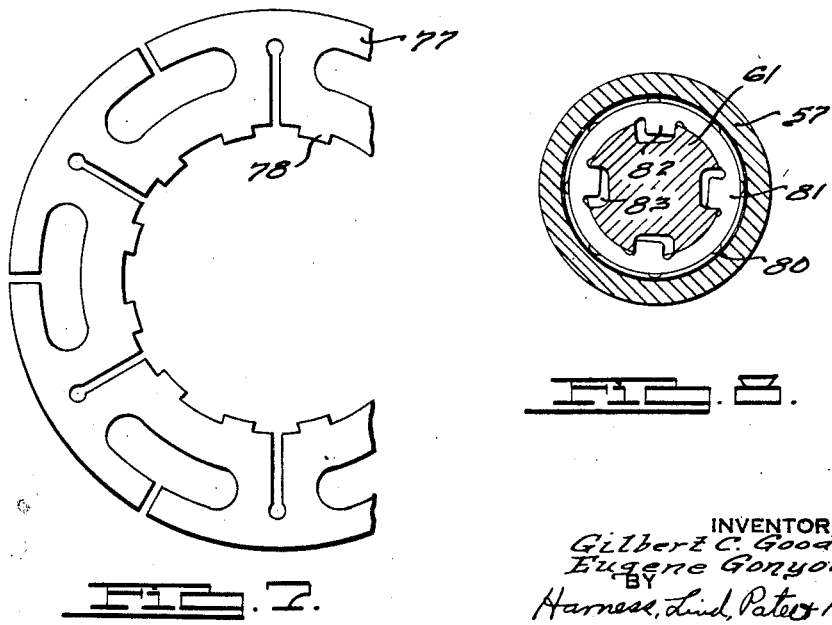
INVENTORS.
Gilbert C. Goode.
Eugene Gonyou.
BY
Harness, Dick, Patent Harris
ATTORNEYS.

Patented May 15, 1945

2,375,785

UNITED STATES PATENT OFFICE 2,375,785

TWO SPEED GENERATOR DRIVE

Gilbert C. Goode, Birmingham, and Eugene Gonyou, Detroit, Mich., assignors to Chrysler Corporation, Highland Park, Mich., a corporation of Delaware Application August 31, 1942, Serial No. 456,757

9 Claims. (Cl. 74—260)

This invention relates to variable speed drives for electrical generators particularly for those used on aircraft.

Most aircraft electrical systems are supplied from generators driven directly off the main engines. The generators are usually constructed such that they deliver normal output when the engines are running at cruising speed, consequently when the engines are idling or running at reduced throttle preparatory to landing or for other purposes, the available electrical power for the operation of auxiliary equipment is greatly reduced. This constitutes a serious problem in large aircraft, particularly in bombers where it is often necessary to operate bomb release mechanism gun turrets, and other power consuming devices while running at slow speed as when sighting on a target.

It is the object of the present invention to provide a variable speed drive for generators, particularly aircraft generators, which will automatically step-up the generator speed when the main engine speed drops to a predetermined value.

Another object is to provide a variable speed drive for aircraft generators which is compact, of light weight and of simple construction.

Another object is to provide a compact, self-contained, automatic, variable speed transmission which is adapted to be inserted between a power source and a load and which requires no outside control mechanism or other auxiliary apparatus.

Other objects and advantages will be apparent from the following description. In the drawings accompanying the description, Fig. 1 is an elevation of a complete electrical power unit mounted on an engine.

Fig. 2 is an enlarged sectional view taken as indicated by the arrows 2—2 on Fig. 1.

Figs. 5, 6, 7 and 8 are detail views of the magnetic clutch parts.

Fig. 9 is a detail view of the centrifugal switch for controlling the magnetic clutch, and Fig. 10 is a sectional view taken as indicated by the arrows 10—10 on Fig. 9.

Figure 3:
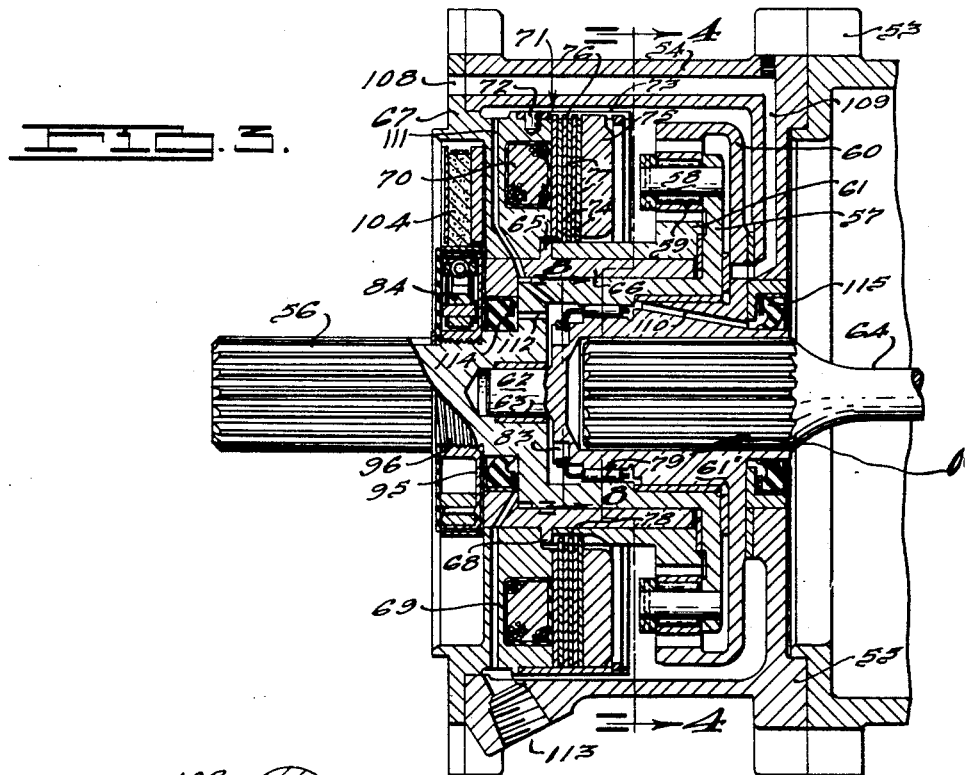
Fig. 3 is a sectional view taken as indicated by the arrows 3—3 on Fig. 2.

Referring now to the drawings wherein reference characters are used to indicate corresponding parts referred to in the description, the main driving engine of the aircraft or other craft or vehicle is indicated at 50. Mounted on the engine by means of elongated studs 51 is the generator 52 which has a suitable flange 53 for receiving the studs.

The variable speed driving mechanism is designated generally by numeral 54 and is provided with a housing 55 having suitable holes through which the studs 51 are adapted to pass.

The change speed unit has a splined input shaft 56 which terminates rearwardly in a bell shaped portion 57. The latter forms a planet carrier and is provided with axles 58 on which are mounted planet pinions 59. These pinions mesh with an annulus gear 60 and a sun gear 61. The annulus gear 60 has an integral hollow hub 61' piloted at 62 in the input shaft 56, a bushing 63 forming a suitable journal. The hub is internally splined for the reception of the generator drive shaft 64.

The sun gear 61 extends forwardly and abuts a shoulder 65 carried by a separator member 66. The shoulder 65 in turn abuts the inner reduced shoulder portion 68 of a member 67 which forms the forward housing end plate. The latter has an annular recess 69 in which is carried a field coil 70 constituting part of a magnetic brake generally designated by the numeral 71.

Fastened to the member 67 by pins 72 is an internally slotted sleeve 73 which supports and carries a plurality of friction discs 74 and an armature 75. The discs 74 and armature 75 are of magnetic material, as is the housing member 67, and are provided with radial splines 76 for engaging the slots in the sleeve 73.

Interleaved with the discs 74 are a number of similar discs 77 splined at 78 to the forwardly extended portion of the sun gear 61.

From the description so far it will be seen that energization of the coil 70 will attract the armature 75 and pack discs 74—78 whereupon the sun gear 61 will be prevented from rotation and the drive from shaft 56 to shaft 64 will be at a ratio greater than 1 to 1 through the planet pinions 59 and the annulus 60, the sun gear 61 furnishing reaction.

Figure 4:
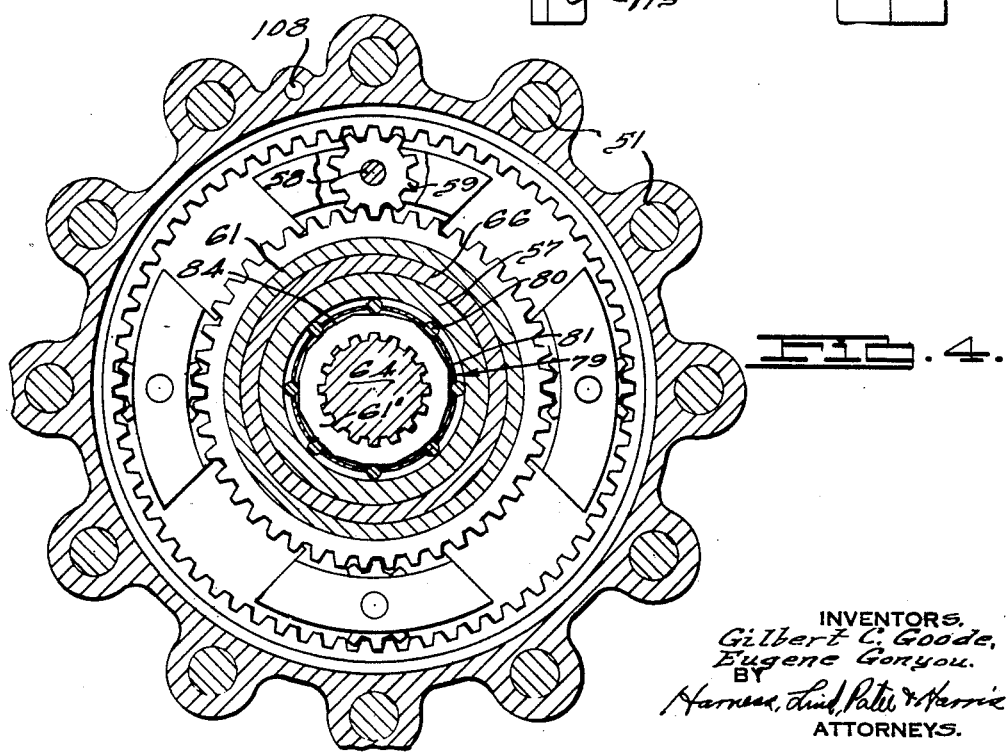
Fig. 4 is a sectional view taken as indicated by the arrows 4—4 on Fig. 2.

When the coil 70 is not energized, the drive between shafts 56 and 64 is at a 1 to 1 ratio through an automatic one-way clutch generally designated at 79. This clutch comprises rollers 80 (see Figs. 4 and 8) carried in spaced relation by a cage 81. The latter has a plurality of radial lugs 82 which loosely engage slots 83 cut in the hub 61' of the annulus gear. The hub 61' has a plurality of cams 84 formed thereon in such position that the high portions of the cams engage the respective rollers 80 to wedge the same into engagement with the adjacent inner cylindrical surface of the carrier 57 in response to counterclockwise rotation of the latter thereby to provide a solid drive between the carrier 57 and the hub 61'. When the brake 71 is engaged, the hub 61' rotates faster than the carrier because of the step-up through the gearing and the rollers 80 release automatically to permit the hub 61' to overrun.

Energization of the coil 70 is controlled by a centrifugally operated switch 84 shown in detail in Figs. 2, 9 and 10. This switch comprises a fixed terminal 85 connected to a slip ring 86 by means of a stud 87, and a movable terminal 88 carried by an arm 89 of spring material. The spring arm 89 has oppositely extending ears 90 which engage holes provided in a pair of oppositely disposed levers 91 as shown in Fig. 10.

The other end of the spring arm 89 engages a groove 92 cut in the peripheral surface of a weight 93. The latter pivotally engages a pin 94 carried by an annular dished member 95 which serves as a switch housing. The latter has a threaded connection at 96 with the shaft 56. A headed pin 97 retains the weight on the pin 94 while allowing free rotation about the axis thereof.

The pin 94 is provided with an axial groove 98 which is engaged by knife edged projections 99 carried by the respective levers 91.

The weight 93 is adapted to swing about the axis of the pin 94 under the influence of centrifugal force, the arc of swing being limited by a pin 100 carried by the member 95. This pin engages one side or the other of an enlarged hole 101 in the weight 93 as illustrated. A spring 102 tends to keep the weight in switch closing position as illustrated in Fig. 2. Fig. 9 shows the weight in an intermediate position between open and closed positions of the switch. When the shaft 56 reaches a predetermined speed of rotation the weight 93 moves outwardly and thereby displaces the groove 92 in a counterclockwise direction as viewed in Figs. 2 and 9. This shifts the fulcrum of the spring member 89 and causes the latter to snap the levers 91 clockwise on the knife edge 99 thus opening the switch. A stop pin 103 limits the switch opening movement of the levers 91.

The slip ring 86 is connected with the field coil 70 by means of a brush 104 and a wire 105. The brush is urged against the ring by a spring 106 carried by a brush holder 107.

The change speed mechanism is lubricated through a passage 108 which is located in the housing 54 such that it is adapted to communicate with an oil pressure port (not shown) provided in the mounting flange on the engine. The passage 108 communicates with a radial passage 109 which conducts the lubricant to the hub 61' and from this point the oil flows through the various passages 110, 111, 112, etc., and around the gears and bearings. A drain 113 is provided at the lowest portion of the casing. Suitable oil seals 114, 115 prevent escape of lubricant around the shafts 56 and 64.

The operation of the device in a typical installation between an aircraft generator and the main engine auxiliary driving shaft is as follows.

When the generator is at rest, the switch 84 will be closed, the spring 102 having swung the weight 93 about the axis of the pin 94 to the position shown in Fig. 2. The field coil 70 of the electromagnetic brake 71 will, therefore, be energized preferably from the main battery supply circuit and the brake 71 will be applied thereby preventing rotation of the sun gear 61.

The generator shaft 64 will thus be driven at an overspeed with respect to the shaft 56 until the shaft has attained a speed of approximately 3,000 R. P. M. whereupon the weight 93 will swing outwardly under the influence of centrifugal force and thereby swing the fulcrum of the spring member 89 in a counterclockwise direction as viewed in Fig. 9 and cause the switch contact 88 to be snapped out of engagement with the switch contact 85. The arms 91 and the contact 88 will be swung clockwise against the stop 103. This opens the circuit to the field coil 70 and renders the brake 71 ineffective. The sun gear 61 is thus free to rotate and as there is no reaction point for the planetary gearing, the hub 61' and shaft 64 will immediately fall off in speed.

The overrunning clutch 79 will, however, operate to provide a direct driving connection between the carrier 57 and the hub 61' as soon as the shafts 64 and 56 become synchronized. The generator 52 will then be driven at the speed of shaft 56 and will continue to be so driven until the speed of the shaft 56 drops to approximately 2400 R. P. M. whereupon the spring 102 will overcome the centrifugal force tending to hold the weight 93 in its outward position and the switch 84 will be snapped to closed position energizing the field coil 70 of the brake 71 and causing the armature 75 thereof to be attracted axially toward the coil to thereby engage the friction plates 76 and 77 and stop rotation of the sun gear.

This will immediately establish the overspeed driving relation between the shafts 56 and 64, the hub 61' overrunning the carrier 57 as will be permitted by release of the rollers 80 of the overrunning clutch 79.

It has been found that an overdrive ratio of 1.714 to 1 is satisfactory under the described conditions to maintain satisfactory power regulation of the generator. By calibrating the speed responsive switch mechanism such that the switch will open at approximately 3000 R. P. M. and close at approximately 2400 R. P. M. and by providing a snap action switch, hunting of the control mechanism is prevented and approximately full power output of the generator is available under practically all conditions of aircraft operation.

It will thus be seen that we have provided an extremely compact and simple power transmission that is self-contained within itself and does not require auxiliary control mechanism or apparatus for its operation. In instances where the variable speed power transmission is not needed, the block of the main engine 50 is provided with relatively shorter studs 51 and the generator 52 may be secured directly on these shorter studs, the generator shaft 64 being received by the internally splined driving member (not shown) of the engine. In cases where our improved power transmission is to be used, it is necessary only to replace the short studs with longer studs and to insert the housing 54 between the engine block 50 and the generator 52 and make the necessary electrical and lubricating supply connections.

In connection with our centrifugally actuated switch 84, it should be noted that we have disposed the movable arm 91 in such manner that the centrifugal force acting on the switch parts has no tendency to change the position of the arm from that which it has been moved by the weight 93. The arm 91 is disposed radially with respect to the axis of the input structure on which it is carried in both its open and closed positions, the change in the position of the fulcrum 99 compensating for the circumferential swing of the arm as it is moved from one of its positions to the other.

While but one specific embodiment of the invention is disclosed, it is contemplated that changes in the form, size and shape of the various parts may be made by those skilled in the art without departing from the spirit or scope of our invention as set forth in the claims appended below.

We claim:

1. In a two speed transmission adapted to drive a generator from an engine, a housing including a removable end plate providing an electro-magnet core, a core energizing coil circumferentially disposed on the end plate within the housing, a shaft projecting outwardly from said housing through an aperture centrally formed in the plate for drivingly connecting the transmission and engine, a spider carried by the inner end of the shaft, planet gears mounted on the spider, a ring gear internally meshing with the planet gears, said ring gear being carried by an internally splined hub adapted to receive a shaft insertible through the housing for drivingly connecting the transmission and generator, a bearing between the hub and the shaft to accommodate relative movement therebetween, a sun gear mounted concentrically with the hub and shaft and meshing with the planet gears, an axially shiftable armature laterally-spaced from said core, a plurality of axially shiftable friction plates carried respectively by the end plate and sun gear and disposed between said core and armature, said friction plates being engageable upon electrical energization of the coil and magnetic energization of said core and armature to hold the sun gear and establish an overdrive between said shaft and said splined hub, an overrunning clutch between the concentrically disposed elements of the gearing to provide a direct drive when the coil is de-energized and said sun gear is released, said overrunning clutch being positioned axially intermediate the outer ends of said end plate and ring gear, a casing concentrically counted on the shaft adjacent said outer surface of the end plate, and a speed responsive switch carried by said casing and rotatable with said shaft for controlling energization of said coil.

2. A two speed transmission mechanism comprising a housing having at one end a removable electro-magnet core centrally apertured to receive a drive shaft, a core energizing winding disposed in a recess in said core, an axially shiftable armature spaced from said core and magnetically energizable upon energization of said winding, a planetary gear set within the housing, said gear set comprising a ring gear, a pinion carrier, and a sun gear provided with hubs concentrically arranged with respect to each other, the hub of the sun gear being formed with a splined portion fitted with clutch plates, said plates being interleaved with other plates connected in stationary relationship to the housing and said clutch plates being all disposed between said core and armature, the hub of the pinion carrier being connected to the drive shaft, the hub of the ring gear being internally splined to receive a driven shaft connection, an overrunning clutch interposed between the pinion carrier hub and another of the hubs concentric therewith and positioned axially intermediate the core and the outer end of the sun gear, and speed responsive control means mounted on the drive shaft adjacent the end plate for controlling electrical energization of said winding such that the sun gear is held from rotation by engagement of said clutch plates upon energization of said core and armature to establish an overdrive between said drive shaft and driven shaft connection and the sun gear and clutch plates are released upon de-energization of said winding to establish a direct drive between said drive shaft and driven shaft connection.

3. A two speed transmission mechanism comprising a housing having a centrally apertured removable electro-magnet core, a core energizing winding disposed in a recess in said core, an axially shiftable armature spaced from said core and magnetically energizable upon energization of said winding, a planetary gear set in the housing, said gear set comprising a ring gear, pinion carrier and sun gear formed with hub portions telescopically positioned with respect to each other and concentric with the end plate, the hub of the pinion carrier being formed with a reduced shaft portion projecting through the aperture of the core, a shouldered member mounted concentrically to the shaft in the end plate and providing a thrust abutment for the hub of the sun gear and pinion carrier, an overrunning clutch mounted between the hub of the pinion carrier and another of said hubs and positioned axially intermediate the core and an end of the sun gear, a friction clutch under control of said core and armature and having cooperable elements respectively carried by the end plate and the hub of the sun gear, and speed responsive control means mounted on the end plate for controlling electrical energization of said winding such that the sun gear is held from rotation by engagement of said cooperable clutch elements upon energization of said core and armature to establish an overdrive between said reduced shaft portion of the pinion carrier hub and the ring gear hub, and the sun gear and cooperable clutch elements are released upon de-energization of said winding to establish a direct drive between said reduced shaft portion of the pinion carrier hub and said ring gear hub.

4. A change speed unit for aircraft engine generator drives comprising coaxial input and output torque transmitting members, a planetary gearset for drivingly connecting said members, a magnetic friction brake mechanism positioned laterally adjacent said gearset for controlling said gearset to obtain a direct drive and another speed ratio drive between said input and output members, a housing enclosing said gearset and mechanism and arranged and constructed for supporting a generator in overhanging relationship thereto, said planetary gearset comprising a rotatable element drivingly connected to said input structure, a second rotatable element drivingly connected to said output structure and a rotatable reaction element, said output member, reaction element and input planetary element having portions telescopically arranged relative to each other and extending in the direction of said brake mechanism, said brake mechanism comprising an electro-magnet core stationarily and removably mounted in said housing and having radially spaced apart annular portions and having a central aperture for accommodating one of said torque transmitting members, a core energizing winding disposed in the space between said annular portions of said core, an axially shiftable armature of magnetizable material laterally spaced from said core and having radial portions in face-to-face relation with said radially spaced annular portions respectively of said core, whereby upon energization of said winding a magnetic circuit will be produced having one leg thereof passing from one of said annular portions to said armature and another from said armature to the other of said annular portions of the core, a plurality of axially-shiftable friction members between said core and armature and having radial portions in face-to-face relation with said radially spaced annular portions respectively of said core, whereby said friction members extend across both legs of said magnetic circuit when said winding is energized, certain of said friction members being drivingly connected with said planetary reaction element and others being stationarily mounted relative to said housing whereby when said winding is energized said reaction element is held from rotation by said friction members to establish a predetermined drive between said input and output members, and an overrunning clutch between a pair of said telescopically arranged portions and positioned intermediate the core and one end of the planetary reaction element for establishing the input and output members in direct drive when said winding is de-energized and said reaction element is released by said brake mechanism.

5. A change speed unit as claimed in claim 4 including control means responsive to rotative speed of said input member for effecting energization of said winding at or above a predetermined speed.

6. A change speed unit for aircraft engine generator drives comprising coaxial input and output torque transmitting members, a housing arranged and constructed for engine mounting at one end and for supporting a generator in overhanging relationship thereto at its other end, an electro-magnet core stationarily and removably mounted in said housing at the engine mounting end thereof said core having radially spaced apart annular portions and a central aperture, a bearing member secured in said aperture for journalling said input member, a core energizing winding disposed in the space between said annular portions of said core, an axially shiftable armature of magnetizable material laterally spaced from said core and having radial portions in face-to-face relation with said radially spaced annular portions respectively of said core, whereby upon energization of said winding a magnetic circuit will be produced having one leg thereof passing from one of said annular portions to said armature and another from said armature to the other of said annular portions of the core, a planetary gearset for drivingly connecting said input and output members positioned adjacent the said other end of the housing, said gearset comprising a rotatable spider drivingly connected to said input member, a ring gear drivingly connected to the output member, and a sun gear journalled on said bearing member, a plurality of axially shiftable friction members between said core and armature and having radial portions in face-to-face relation with said radially spaced annular portions respectively of said core, whereby said friction members extend across both legs of said magnetic circuit when said winding is energized, certain of said friction members being drivingly connected with said sun gear and others being stationarily mounted relative to said housing whereby when said winding is energized said sun gear is held from rotation by said friction members to establish an overdrive between said input and output members, and an overrunning clutch between said carrier and one of the other aforementioned planetary members and positioned intermediate the core and one end of the sun gear for connecting said input and output members in direct drive when said winding is de-energized.

7. A change speed unit as claimed in claim 6 wherein the input member has a splined portion projecting from the core and the output member has a splined socket.

8. A change speed unit as claimed in claim 6 including centrifugal switch means carried by the input member for controlling said winding and operable at predetermined speed to energize said winding and establish said unit in overdrive.

9. A change speed unit comprising in combination coaxial input and output torque transmitting members, a planetary gearset for drivingly connecting said members, a magnetic friction brake mechanism positioned laterally adjacent said gearset for controlling said gearset to obtain a direct drive and another speed ratio drive between said input and output members, said gearset comprising a rotatable element drivingly connected to said input structure, a second rotatable element drivingly connected to said output structure, an overrunning clutch device connected between said rotatable elements, and a rotatable reaction element, said brake mechanism comprising a relatively stationarily mounted electromagnet core surrounding one of said members, an annular channel in a lateral face of said core providing magnetically spaced annuli, a core energizing winding in said channel, an axially shiftable armature of magnetizable material laterally spaced from said annuli, a plurality of sets of axially shiftable friction members between said core and armature, said friction members having radially spaced apart portions of magnetizable material in substantial alignment with said core annuli whereby a plurality of flux paths may be established upon energization of said core through said core, friction members, and armature, certain of said friction members being drivingly connected to said stationary core and others to said reaction member of said planetary gearset whereby one speed ratio drive may be established upon energization of said winding and direct drive may be established upon de-energization thereof.

GILBERT C. GOODE.
EUGENE GONYOU.